(12) United States Patent
Hecht et al.

(10) Patent No.: US 11,766,724 B1
(45) Date of Patent: Sep. 26, 2023

(54) CUTTING TOOL AND TOOL HOLDER HAVING SEPARATE REAR ABUTMENT AND WEDGED REAR STOPPER SURFACES

(71) Applicant: ISCAR, LTD., Tefen (IL)

(72) Inventors: Gil Hecht, Nahariya (IL); Sergey Chistyakov, Nahariya (IL)

(73) Assignee: Iscar, Ltd., Tefen (IL)

( * ) Notice: Subject to any disclaimer, the term of this patent is extended or adjusted under 35 U.S.C. 154(b) by 22 days.

(21) Appl. No.: 17/696,177

(22) Filed: Mar. 16, 2022

(51) Int. Cl.
| B23B 29/04 | (2006.01) |
| B23B 27/08 | (2006.01) |
| B23B 27/16 | (2006.01) |
| B23B 27/04 | (2006.01) |

(52) U.S. Cl.
CPC ........... *B23B 27/1611* (2013.01); *B23B 27/04* (2013.01); *B23B 29/043* (2013.01); *B23B 2205/02* (2013.01)

(58) Field of Classification Search
CPC ... B23B 27/04; B23B 29/043; B23B 2205/02; B23B 29/14; B23B 27/1611; B23B 27/086; Y10T 407/2288
See application file for complete search history.

(56) References Cited

U.S. PATENT DOCUMENTS

| 3,760,474 | A | | 9/1973 | Stein | |
| 4,909,677 | A | * | 3/1990 | Noguchi | B23B 27/04 |
| | | | | | 407/66 |
| 5,161,920 | A | * | 11/1992 | Zinner | B23B 27/045 |
| | | | | | D15/139 |
| 5,676,495 | A | | 10/1997 | Katbi et al. | |
| 5,829,924 | A | * | 11/1998 | Oshnock | B23B 27/045 |
| | | | | | 407/117 |
| 5,921,724 | A | | 7/1999 | Erickson et al. | |
| 5,934,843 | A | | 8/1999 | Brask et al. | |
| 6,086,291 | A | | 7/2000 | Hansson et al. | |
| 6,261,032 | B1 | | 7/2001 | Duwe et al. | |
| 6,428,247 | B1 | | 8/2002 | Friedman | |

(Continued)

FOREIGN PATENT DOCUMENTS

| DE | 3420653 A | * 12/1985 | ............. B23B 27/04 |
| DE | 3828657 A | * 3/1990 | ............. B23B 27/04 |

(Continued)

OTHER PUBLICATIONS

International Search Report dated Jun. 9, 2023, issued in PCT counterpart application No. PCT/IL2023/050179.

(Continued)

*Primary Examiner* — Sara Addisu
(74) *Attorney, Agent, or Firm* — Womble Bond Dickinson (US) LLP

(57) ABSTRACT

A cutting tool includes a holder and a cutting insert releasably clamped in the holder. The holder has a rear pocket surface which includes a pocket abutment surface and an adjacent pocket wedge surface. The cutting insert has at least one abutment surface and an adjacent wedge surface. When the cutting tool is assembled but not in use, the pocket abutment surface of the holder abuts the abutment surface of the cutting insert, and the wedge surface of the holder is facing and spaced apart from the wedge surface of the cutting insert. During cutting operations, the wedge surface of the insert may abut against the wedge surface of the holder.

23 Claims, 8 Drawing Sheets

(56) References Cited

U.S. PATENT DOCUMENTS

| | | | | |
|---|---|---|---|---|
| 7,866,924 | B2* | 1/2011 | Nagaya | B23B 27/04 |
| | | | | 407/102 |
| 9,242,300 | B2* | 1/2016 | Kaufmann | B23B 27/04 |
| 9,539,656 | B2* | 1/2017 | Zeeb | B23B 27/04 |
| 2002/0081165 | A1* | 6/2002 | Hecht | B23C 5/08 |
| | | | | 407/117 |
| 2008/0240874 | A1 | 10/2008 | Nagaya et al. | |
| 2009/0285645 | A1 | 11/2009 | Hecht | |
| 2010/0119314 | A1 | 5/2010 | Nagaya et al. | |
| 2012/0082519 | A1 | 4/2012 | Hecht | |
| 2013/0167345 | A1* | 7/2013 | Hecht | B23B 29/043 |
| | | | | 29/267 |
| 2014/0234040 | A1* | 8/2014 | Hecht | B23B 27/04 |
| | | | | 407/107 |
| 2020/0368829 | A1* | 11/2020 | Shin | B23B 27/045 |
| 2023/0137637 | A1* | 5/2023 | Athad | B23B 27/04 |
| | | | | 407/113 |

FOREIGN PATENT DOCUMENTS

| | | | | |
|---|---|---|---|---|
| DE | 102011053760 A1 * | 3/2013 | | B23B 27/04 |
| EP | 3 421 159 | 1/2019 | | |
| JP | 2017052024 A * | 3/2017 | | B23B 27/04 |
| WO | WO-9710911 A1 * | 3/1997 | | B23B 27/045 |

OTHER PUBLICATIONS

Written Opinion dated Jun. 9, 2023, issued in PCT counterpart application No. PCT/IL2023/050179.

* cited by examiner

CUTTING TOOL AND TOOL HOLDER HAVING SEPARATE REAR ABUTMENT AND WEDGED REAR STOPPER SURFACES

FIELD OF THE INVENTION

The subject matter of the present application relates to turning cutting tools, and more specifically to grooving and parting tools used in metal cutting operations.

BACKGROUND OF THE INVENTION

It is known in the field of metal cutting to provide a cutting insert with a wedge formed on its rear stopper, as seen in U.S. Pat. Nos. 9,242,300, 5,934,843 and EP 3,421,159. Adding a wedged rear stopper may further strengthen the cutting insert's resilience to lateral forces arising from cutting operations.

Forming wedges on the top and bottom surfaces of a cutting insert is also known in the field of metal machining.

Using both wedged top and bottom surfaces along with a wedged rear surface is therefore advantageous for increasing the insert's resilience to lateral forces and allows for more precise metal machining, due to the increased stability of the cutting insert.

However, adding a wedged rear stopper to a cutting insert, especially in conjunction with wedged top and bottom surfaces, poses an issue of reliability of the positioning of the cutting edge of the cutting insert.

Due to human error the cutting insert may be inserted only partially into an insert seat. To elaborate, the operator may believe the insert to be fully inserted due to partial contact between the wedged rear stopper of the insert and the wedged rear surface of the cutting tool.

Furthermore, in cases where both prismatic top and bottom surfaces are used in conjunction with a prismatic rear stopper, it is possible for misalignment between the three prisms to occur, due to the complexity of aligning three pairs of converging abutment surfaces with one another.

Such cases may lead to repeatability problems, seeing as slight changes in the geometry of the holder, or cutting insert, may lead to different positioning of the cutting edge.

It is an object of the subject matter of the present application to provide a cutting tool with repeatable positioning along with lateral support during machining operations.

SUMMARY OF THE INVENTION

In accordance with a first aspect of the subject matter of the present application there is provided a cutting tool, comprising:
   a cutting insert extending along an insert longitudinal axis defining an insert forward direction and an insert rearward direction, the insert comprising:
      an insert forward surface and an opposing insert rearward surface, with an insert peripheral surface extending therebetween;
      the insert rearward surface comprising an insert rear abutment surface and a V-shaped insert rear wedge surface;
      the insert peripheral surface comprising an insert top surface, an opposing insert bottom surface, a first insert side surface and an opposing second insert side surface; and
      a first cutting edge formed at an intersection of the insert top surface and the insert forward surface;
   and
   a tool holder extending along a holder longitudinal axis defining a holder forward direction and a holder rearward direction, comprising:
      a first holder side surface and an opposing second holder side surface, with a holder front surface extending therebetween; and
      an insert pocket opening out to the holder front surface, the first holder side surface and the second holder side surface, the insert pocket comprising:
         a top pocket surface and an opposing bottom pocket surface, with a rear pocket surface located therebetween, the rear pocket surface comprising:
            a pocket abutment surface; and
            a V-shaped pocket wedge surface distinct from the pocket abutment surface;
wherein
   the cutting tool is adjustable between a disassembled state and an assembled state; and
   when the cutting tool is in the assembled state:
      the cutting insert is releasably clamped in the insert pocket;
      the insert top surface abuts the top pocket surface;
      the insert bottom surface abuts the bottom pocket surface;
      the insert rear abutment surface abuts against the pocket abutment surface; and
      the insert rear wedge surface faces the pocket wedge surface and is spaced apart therefrom by a minimal margin d.

In accordance with a second aspect of the subject matter of the present application there is provided a double-ended cutting insert having an insert longitudinal axis defining an insert forward direction and an insert rearward direction, an insert vertical axis defining an insert top direction and an insert bottom direction, the insert vertical axis intersecting the insert longitudinal axis, with a longitudinal insert plane defined as containing the insert vertical axis and the insert longitudinal axis, the cutting insert comprising:
   an insert forward surface and an opposing insert rearward surface, with an insert peripheral surface extending therebetween;
   an insert top surface and an opposing insert bottom surface, each extending along the insert peripheral surface;
   a first cutting edge formed at an intersection of the insert top surface and the insert forward surface; and
   a second cutting edge formed at an intersection of the insert peripheral surface and the insert rearward surface;
   wherein:
      the insert rearward surface comprises:
      an insert rear relief surface extending from the second cutting edge;
      an insert rear abutment surface;
   an insert rear wedge surface;
      the insert forward surface comprises:
      an insert forward relief surface extending from the first cutting edge;
      an insert forward abutment surface; and
      an insert forward wedge surface.

In accordance with a third aspect of the subject matter of the present application there is provided a tool holder extending along a holder longitudinal axis defining a holder forward direction and a holder rearward direction, the tool holder comprising:

a first holder side surface and an opposing second holder side surface, with a holder front surface extending therebetween; and an insert pocket opening out to the holder front surface, the first holder side surface and the second holder side surface, the insert pocket comprising:
   a top pocket surface and an opposing bottom pocket surface, with a rear pocket surface located therebetween;

wherein:

the rear pocket surface comprises:
   a pocket abutment surface; and
   a V-shaped pocket wedge surface distinct from the pocket abutment surface.

It is understood that the above-said is a summary, and that features described hereinafter may be applicable in any combination to the subject matter of the present application, for example, any of the following features may be applicable to the cutting insert and/or the cutting tool and/or the tool holder.

A cutting tool having an insert rear abutment surface abutting against a pocket abutment surface allows reliable positioning of the cutting edge. At the same time, having an insert rear wedge surface facing and spaced apart from a pocket wedge surface allows repeatable engagement between the insert rear abutment surface and the pocket abutment surface.

During cutting operations, depending on the intensity of the lateral forces arising from the cutting operation and the minimal margin d between the insert rear wedge surface and the pocket wedge surface, the insert rear wedge surface may abut the pocket wedge surface, assisting in stabilizing the cutting insert in the insert pocket against the cutting forces. Thus, the advantage of easy and reliable positioning of the cutting edge is kept while also keeping the stability by virtue of a wedged rear stopper.

The insert top surface can comprise a pair of top insert wedge surfaces which converge from the first and second insert side surfaces; the insert bottom surface can comprise a pair of bottom insert wedge surfaces which converge from the first and second insert side surfaces; the top pocket surface can comprise a pair of top pocket wedge surfaces which converge from the first and second holder side surfaces, and are configured for engagement with the pair of top insert wedge surfaces; and the bottom pocket surface can comprise a pair of bottom pocket wedge surfaces which converge from the first and second holder side surfaces and are configured for engagement with the pair of bottom insert wedge surfaces.

The pairs of top and bottom insert wedge surfaces can extend and converge concavely; and the pairs of top and bottom pocket wedge surfaces can extend and converge convexly.

The insert rear wedge surface can comprise a pair of insert rear stopper surfaces which converge concavely from the first and second insert side surfaces; and the pocket wedge surface can comprise a pair of rear pocket stopper surfaces which converge convexly from the first and second holder side surfaces and are configured for engagement with the pair of insert rear stopper surfaces.

An insert rear wedge angle A can be defined between the pair of insert rear stopper surfaces; a pocket wedge angle B can be defined between the pair of rear pocket stopper surfaces; and the insert rear wedge angle A and the pocket wedge angle B can fulfil the condition: $90° \leq A \leq B \leq 150°$.

The minimal margin d can fulfill the condition: $0.01 \text{ mm} \leq d \leq 0.1 \text{ mm}$.

The cutting insert can further comprise a second cutting edge formed at an intersection of the insert rearward surface and the insert peripheral surface; the insert pocket can further comprise a pocket relief gap located between one of the top and bottom pocket surfaces and the rear pocket surface; and when the cutting tool is assembled the second cutting edge is located in the pocket relief gap.

The insert rearward surface can further comprise an insert rear relief surface extending from the second cutting edge; and when the cutting tool is assembled, the insert rear relief surface may be located in the pocket relief gap.

The insert rear abutment surface can be located between the insert rear relief surface and the insert rear wedge surface; the insert forward surface can comprise: an insert forward relief surface extending from the first cutting edge; an insert forward abutment surface; and an insert forward wedge surface extending from the insert forward abutment surface; and the insert forward abutment surface can be located between the insert forward relief surface and the insert forward wedge surface.

The insert rear wedge surface may extend to the insert peripheral surface; and the insert forward wedge surface may extend to the insert bottom surface.

The cutting insert can be resiliently clamped in the tool holder.

In some embodiments, the insert rear wedge surface comprises a pair of converging insert rear stopper surfaces which define a rear groove on the insert rearward surface, the rear groove being recessed into the insert rearward surface relative to at least a portion of the insert rear abutment surface; there is no overlap between the insert rear abutment surface and the insert rear wedge surface in a vertical direction extending between the insert top surface and the insert bottom surface; no portion of the insert rear abutment surface is coplanar with any portion of the insert rear wedge surface; and the pocket abutment surface, together with the V-shaped pocket wedge surface, constitute a forwardly protruding rear pocket rib, and wherein on the rear pocket rib: a vertical extent of the V-shaped pocket wedge surface differs from a vertical extent of the pocket abutment surface; a lateral extent of the V-shaped pocket wedge surface differs from a lateral extent of the pocket abutment surface; and no portion of the V-shaped pocket wedge surface is coplanar with the pocket abutment surface.

The insert rear wedge surface can comprise a pair of insert rear stopper surfaces; an insert rear wedge angle A can be defined between the pair of insert rear stopper surfaces; and the insert rear wedge angle can fulfil the condition: $90° \leq A \leq 150°$.

In some embodiments, the insert rear wedge surface comprises a pair of converging insert rear stopper surfaces which define a rear groove on the insert rearward surface, the rear groove being recessed into the insert rearward surface relative to at least a portion of the insert rear abutment surface; there is no overlap between the insert rear abutment surface and the insert rear wedge surface along the insert vertical axis; and no portion of the insert rear abutment surface is coplanar with any portion of the insert rear wedge surface.

The second cutting edge can be formed at an intersection of the insert top surface and the insert rearward surface; the insert rear abutment surface can be closer to the insert top surface than the insert rear wedge surface; and the cutting insert can have 180° rotational symmetry about the insert vertical axis.

The second cutting edge can be formed at an intersection of the insert bottom surface and the insert rearward surface;

the insert rear abutment surface can be closer to the insert bottom surface than the insert rear wedge surface; and the cutting insert can have 180° rotational symmetry about an insert lateral axis, which intersects, and is perpendicular to, both the insert longitudinal axis and the insert vertical axis.

The insert top surface can comprise a pair of top insert wedge surfaces which converge from the insert sides surfaces. The insert bottom surface can comprise a pair of bottom insert wedge surfaces which converge from the insert side surfaces. The top pocket surface can comprise a pair of top pocket wedge surfaces which converge from the holder side surfaces. The pair of top pocket wedge surfaces are configured for engagement with the top insert wedge surfaces. The bottom pocket surface can comprise a pair of bottom pocket wedge surfaces which converge from the holder side surfaces. The bottom pocket wedge surfaces can be configured for engagement with the bottom insert wedge surfaces.

The insert pocket can further comprise a pocket relief gap, located between the rear pocket surface and at least one of the top and bottom pocket surfaces.

The pocket abutment surface can be closer to the top pocket surface than the pocket wedge surface; and the pocket relief gap can be located between the top pocket surface and the rear pocket surface.

The pocket abutment surface can be closer to the bottom pocket surface than the pocket wedge surface; and the pocket relief gap can be located between the bottom pocket surface and the rear pocket surface.

A pocket wedge angle B may be defined between the pair of rear pocket stopper surfaces; and the pocket wedge angle B may fulfil the condition: $90° \leq B \leq 150°$.

The pocket abutment surface, together with the V-shaped pocket wedge surface, may constitute a forwardly protruding rear pocket rib, and wherein on the rear pocket rib: a vertical extent of the V-shaped pocket wedge surface may differ from a vertical extent of the pocket abutment surface; a lateral extent of the V-shaped pocket wedge surface may differ from a lateral extent of the pocket abutment surface; and it may be that no portion of the V-shaped pocket wedge surface is coplanar with the pocket abutment surface.

BRIEF DESCRIPTION OF THE FIGURES

For a better understanding of the present application and to show how the same may be carried out in practice, reference will now be made to the accompanying drawings, in which:

FIG. 3b is a side view of the cutting insert shown in FIG. 3a;

FIG. 3c is a front view of the cutting insert shown in FIG. 3a;

FIG. 3d is a rear view of the cutting insert shown in FIG. 3a;

FIG. 3e is a top view of the cutting insert shown in FIG. 3a;

FIG. 3f is a bottom view of the cutting insert shown in FIG. 3a;

FIG. 5b is a detail of the FIG. 5a;

FIG. 6 is a cross-section view of the cutting tool shown in FIG. 1 along line VI-VI in FIG. a;

FIG. 8b is a side view of a tool holder shown in FIG. 8a;

FIG. 8c is a front view of the tool holder shown in FIG. 8b;

FIG. 9a is a perspective view of a cutting insert shown in FIG. 8a;

FIG. 9b is a side view of the cutting insert shown in FIG. 9a;

FIG. 9c is a front view of the cutting insert shown in FIG. 9a;

FIG. 9d is a rear view of the cutting insert shown in FIG. 9a;

FIG. 10b is a side view of the cutting insert shown in FIG. 10a; and

FIG. 10c is a rear view of the cutting insert shown in FIG. 10a.

Figure 1:
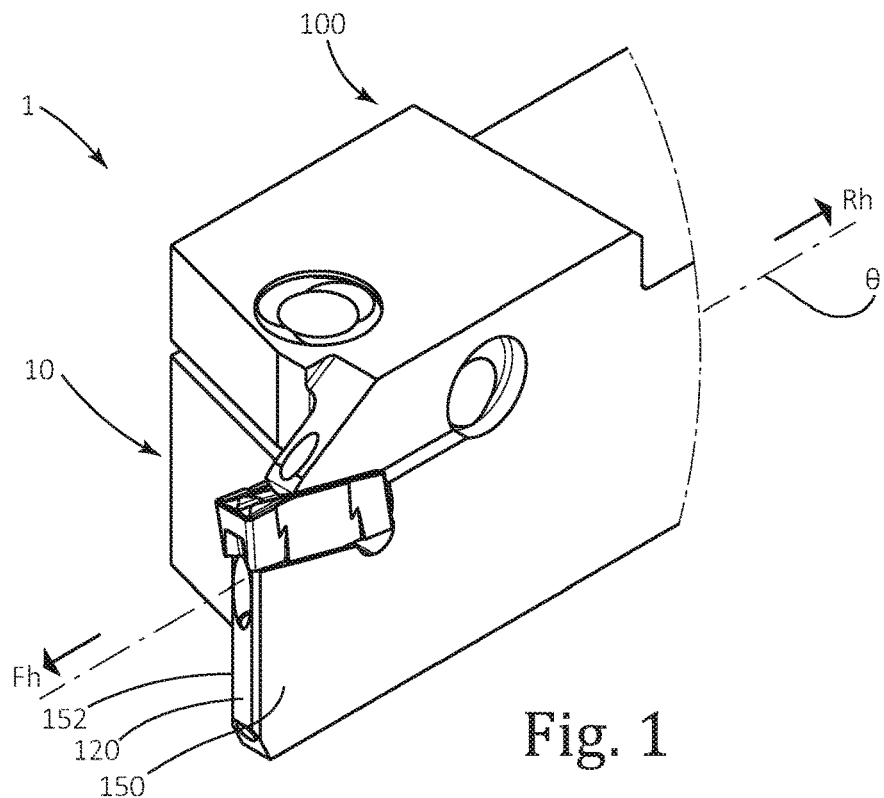
FIG. 1 is a perspective view of an assembled cutting tool in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
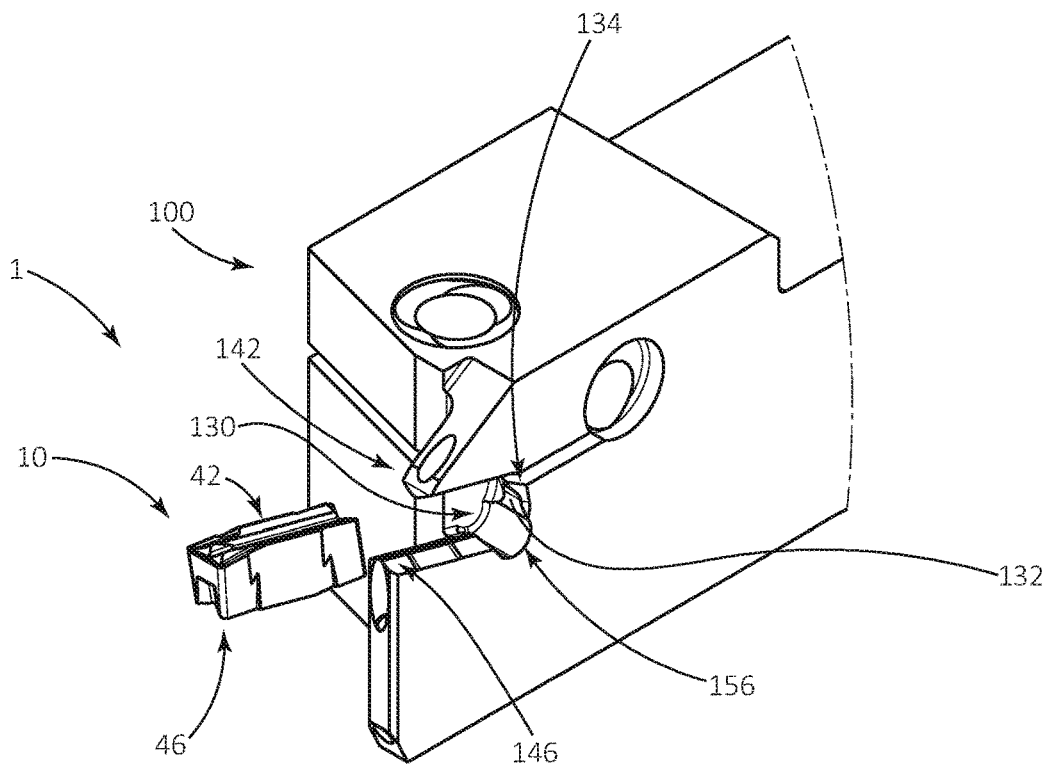
FIG. 2 is an exploded perspective view of the cutting tool shown in FIG. 1.

Attention is first drawn FIGS. 1 and 2 showing a cutting tool 1 according to the present application. The cutting tool 1 includes a cutting insert 10 and a tool holder 100. When the cutting tool 1 is assembled the cutting insert 10 is releasably clamped in the tool holder 100. When the cutting tool 1 is disassembled the cutting insert 10 is removed from the tool holder 100. The cutting insert 10 may be releasably clamped in the tool holder 100 using fastening elements, such as screws (not shown).

Drawing attention to FIGS. 3a-3f, the cutting insert 10 extends along an insert longitudinal axis L, defining an insert forward direction Fi and an insert rearward direction Ri. The cutting insert 10 also has an insert vertical axis V defining an insert top direction Ti and an insert bottom direction Bi. The insert vertical axis V intersects the insert longitudinal axis L, with a longitudinal insert plane P1 defined as containing both the insert longitudinal axis L and the insert vertical axis V.

The cutting insert 10 further has an insert lateral axis C, which intersects, and is perpendicular to, both the insert longitudinal axis L and the insert vertical axis V. As discussed further below, in some embodiments, the cutting insert 10 exhibits 180° rotational symmetry about the insert lateral axis C.

The cutting insert 10 includes an insert forward surface 20 and an opposing insert rearward surface 30, with an insert peripheral surface 40 extending therebetween. The insert peripheral surface 40 extends about the insert longitudinal axis L. The insert forward surface 20 is located at a forward end of the cutting insert 10. The insert rearward surface 30 is located at a rearward end of the cutting insert 10.

The insert peripheral surface 40 includes an insert top surface 42, an opposing insert bottom surface 46, a first insert side surface 50 and an opposing second insert side surface 52. A first cutting edge 54 is formed at an intersection of the insert top surface 42 and the insert forward surface 20. The insert forward surface 20 includes an insert forward relief surface 28 extending from the first cutting edge 54 towards the insert bottom surface 46.

The insert rearward surface 30 includes an insert rear abutment surface 32 and a V-shaped insert rear wedge surface 34. In accordance with some embodiments, the insert rear wedge surface 34 may extend to the insert peripheral surface 40.

The insert rear wedge surface 34 may include a pair of insert rear stopper surfaces 36a, 36b.

In accordance with some embodiments, the pair of insert rear stopper surfaces 36a, 36b can converge concavely, from the first and second insert side surfaces 50, 52 toward the longitudinal insert plane P1, in the direction of the insert forward surface 20 (i.e., in the insert forward direction Fi). To clarify, one of the pair of insert rear stopper surfaces 36a, 36b is closer to the first insert side surface 50, with the other surface of the pair being closer to the second insert side surface 52. The pair of insert rear stopper surfaces 36a, 36b converge toward one another away from the first and second insert side surfaces 50, 52 (rather than away from the insert top and insert bottom surfaces 42, 46). Each surface of the pair of insert rear stopper surfaces 36a, 36b may be planar or curved. Preferably, each surface of the pair of insert rear stopper surfaces 36a, 36b is planar.

In such case, the converging pair of insert rear stopper surfaces 36a, 36b straddle the longitudinal insert plane P1 and define a rear groove 37 on the insert rearward surface 30. In some insert embodiments, the rear groove 37 may be recessed into the insert rearward surface 30, relative to at least a portion of the insert rear abutment surface 32.

In accordance with some embodiments, the insert rear abutment surface 32 is closer to the insert bottom surface 46 than the insert rear wedge surface 34. In some embodiments, there is no overlap between the insert rear abutment surface 32 and the insert rear wedge surface 34 in the vertical direction (i.e., the direction of the insert vertical axis V). In some embodiments, no portion of the insert rear abutment surface 32 is coplanar with any portion of the insert rear wedge surface 34.

The insert top surface 42 may include a pair of top insert wedge surfaces 44a, 44b which converge from the first and second insert sides surfaces 50, 52. In accordance with some embodiments, the pair of top insert wedge surfaces 44a, 44b can extend and converge concavely. In such case, the pair of top insert wedge surfaces 44a, 44b straddle the longitudinal insert plane P1 and define a top groove 45 on the insert top surface 42.

The insert bottom surface 46 may include a pair of bottom insert wedge surfaces 48a, 48b which converge from the first and second insert side surfaces 50, 52. In accordance with some embodiments, the pair of bottom insert wedge surfaces 48a, 48b can extend and converge concavely. In such case, the pair of bottom insert wedge surface 48a, 48b straddle the longitudinal insert plane P1 and define a bottom groove 49 on the insert bottom surface 46.

Figure 4:
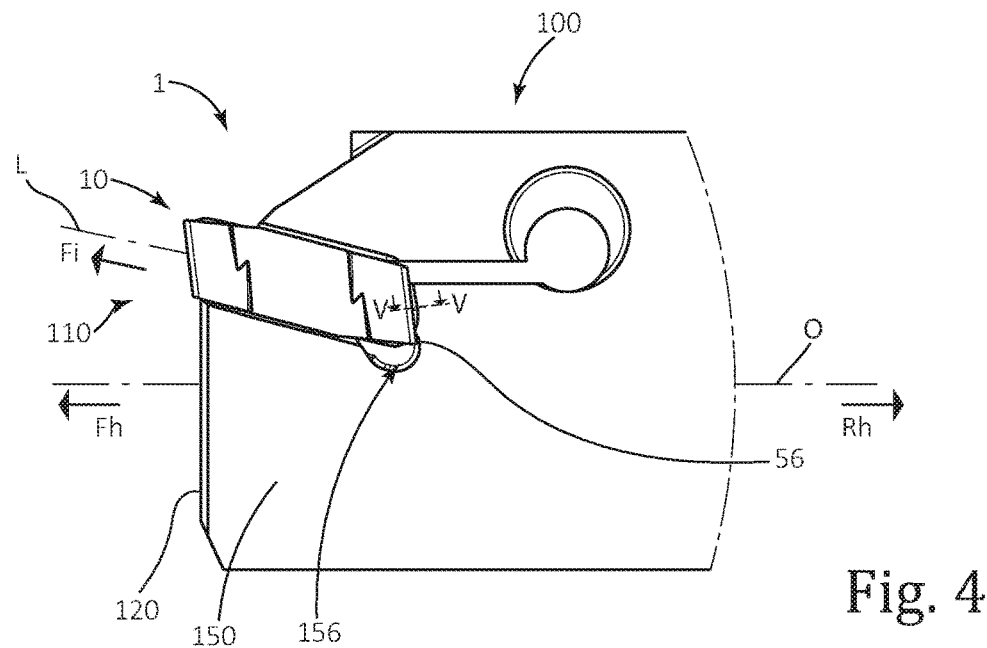
FIG. 4 is a side view of the cutting tool shown in FIG. 1.
Figure 5A:
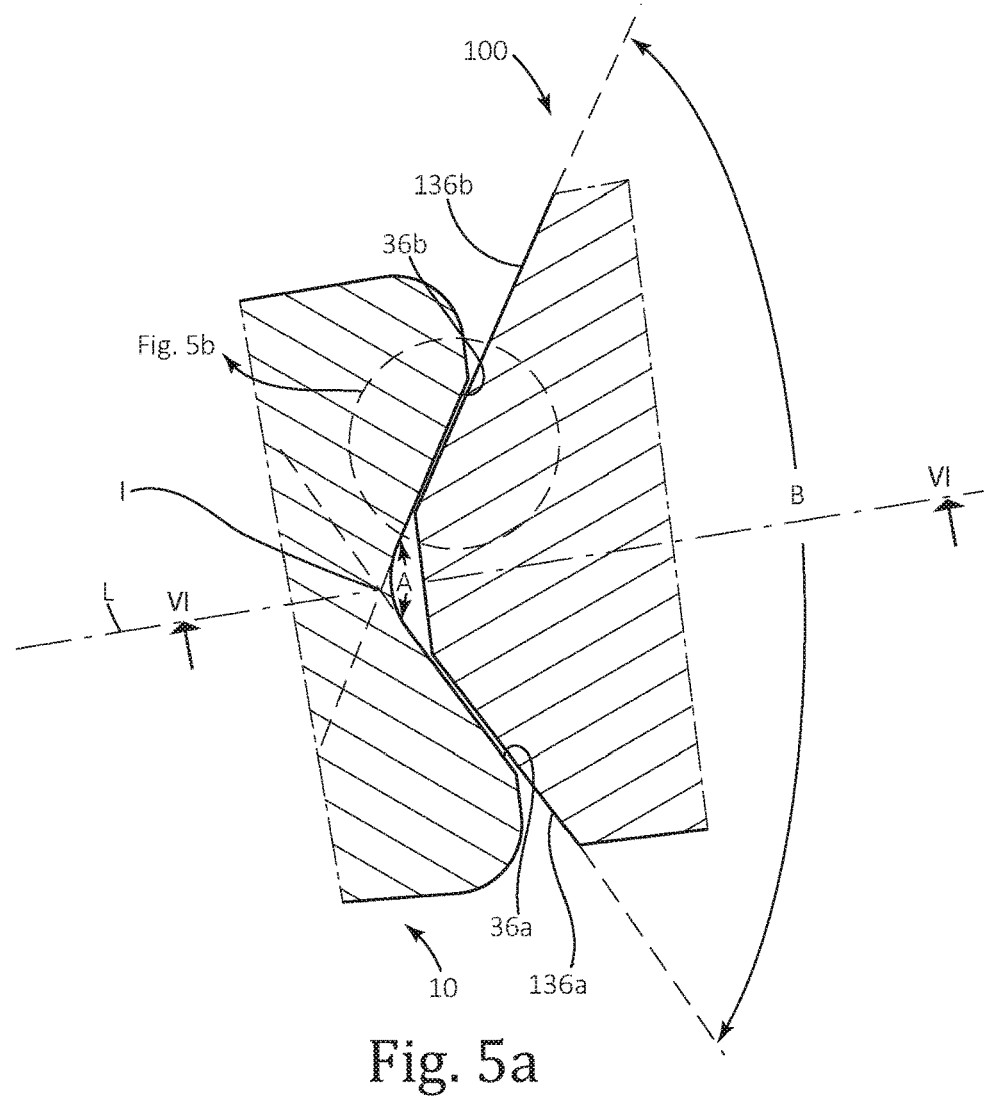
FIG. 5a is a cross-section view of the cutting tool shown in FIG. 1 along line V-V in FIG. 4.
Figure 5B:
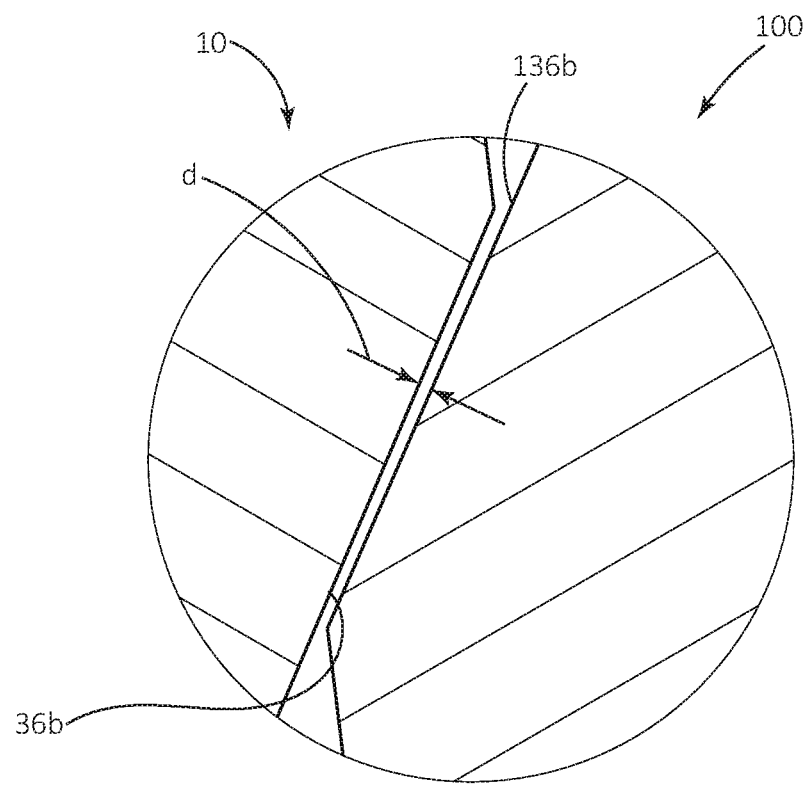
Figure 6:
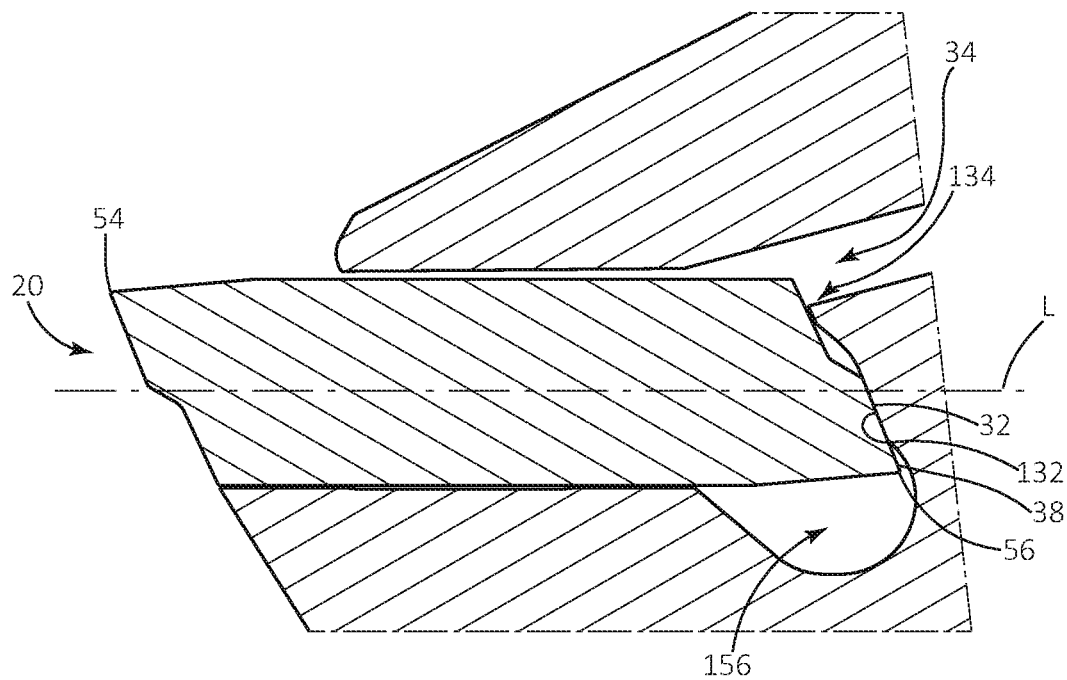
Figure 7:
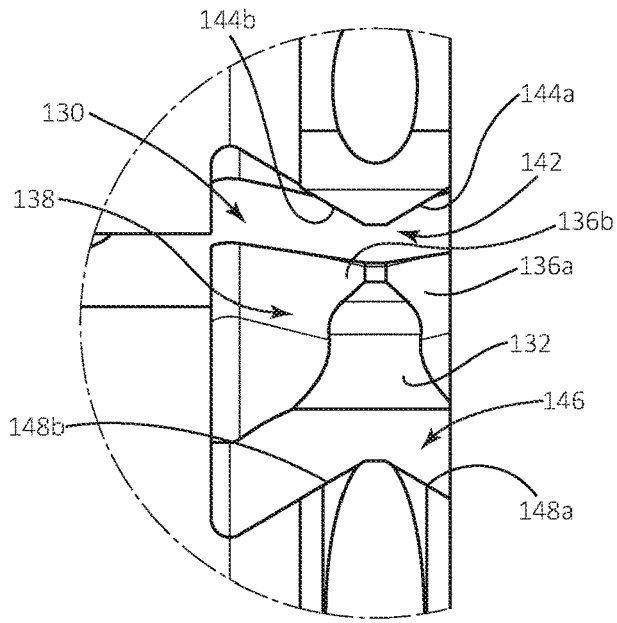
FIG. 7 is a front view of a tool holder shown in FIG. 1.

In accordance with some embodiments, as seen in FIGS. 4 to 6, cross-section line V-V extends perpendicular to an intersection line I. Intersection line I, shown in FIG. 5a, is defined as the intersection between the extensions of the pair of insert rear stopper surfaces 36a, 36b. FIG. 5a, cross-section line VI-VI extends parallel to the insert longitudinal axis L.

Figure 3A:
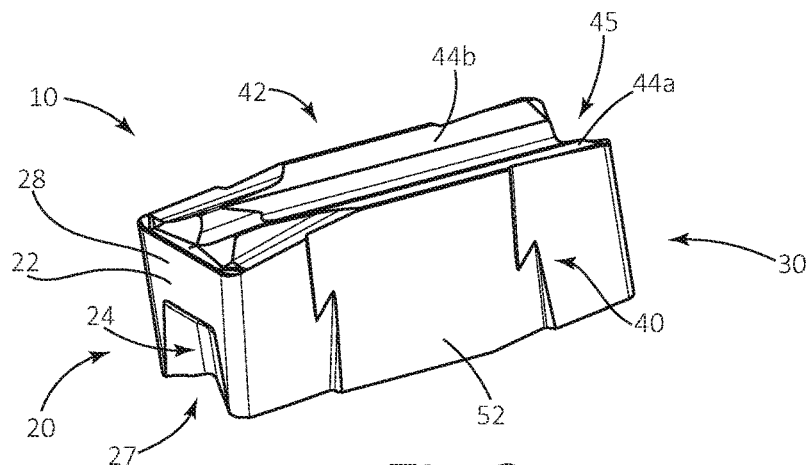
FIG. 3a is a perspective view of a cutting insert shown in FIG. 1.
Figure 3F:
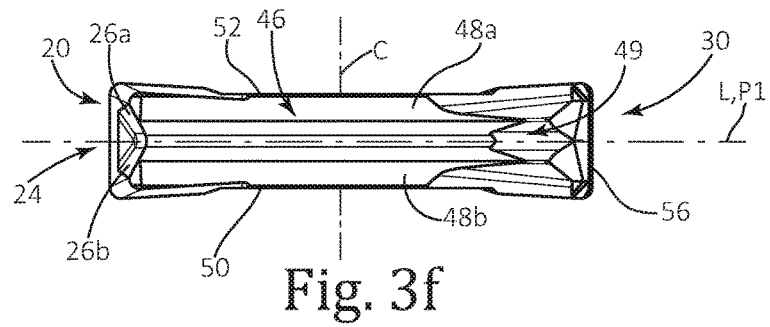
Figure 3D:
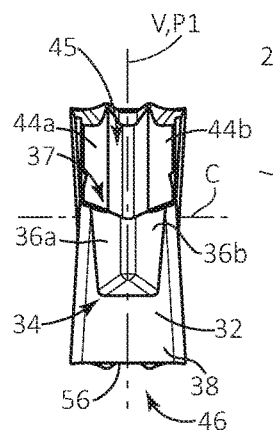
Figure 3B:
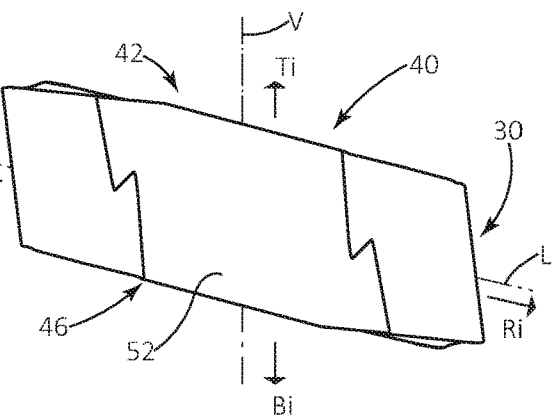
Figure 3C:
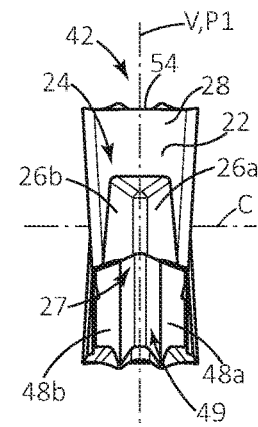
Figure 3E:
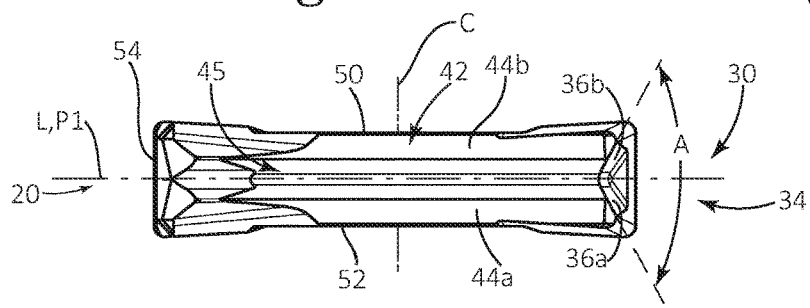

An insert rear wedge angle A is defined between the pair of insert rear stopper surfaces 36a, 36b, as seen in FIGS. 3e and 5a. Smaller values of the insert rear wedge angle A allow for better resistance against forces directed in the direction of the insert lateral axis C (i.e. lateral forces), in part due to the pair of insert rear stopper surfaces 36a, 36b having a greater surface area in the lateral direction for inserts having similar width. On the other hand, smaller value of the insert rear wedge angle A may weaken the rigidity of the cutting insert 10 clamped in the tool holder 100 against lateral forces. Thus, in some embodiments, the insert rear wedge angle A preferably fulfills the condition: $90° \leq A \leq 150°$. More preferably, the insert rear wedge angle A fulfills the condition: $110° \leq A \leq 130°$.

Now referring to FIGS. 8a to 10c, another cutting tool 1' and other embodiments of the cutting insert 10', 10" and tool holder 100' according to the present invention are shown. The cutting insert 10', 10" is releasably clamped in the tool holder 100', and is preferably resiliently clamped therein.

Figure 10A:
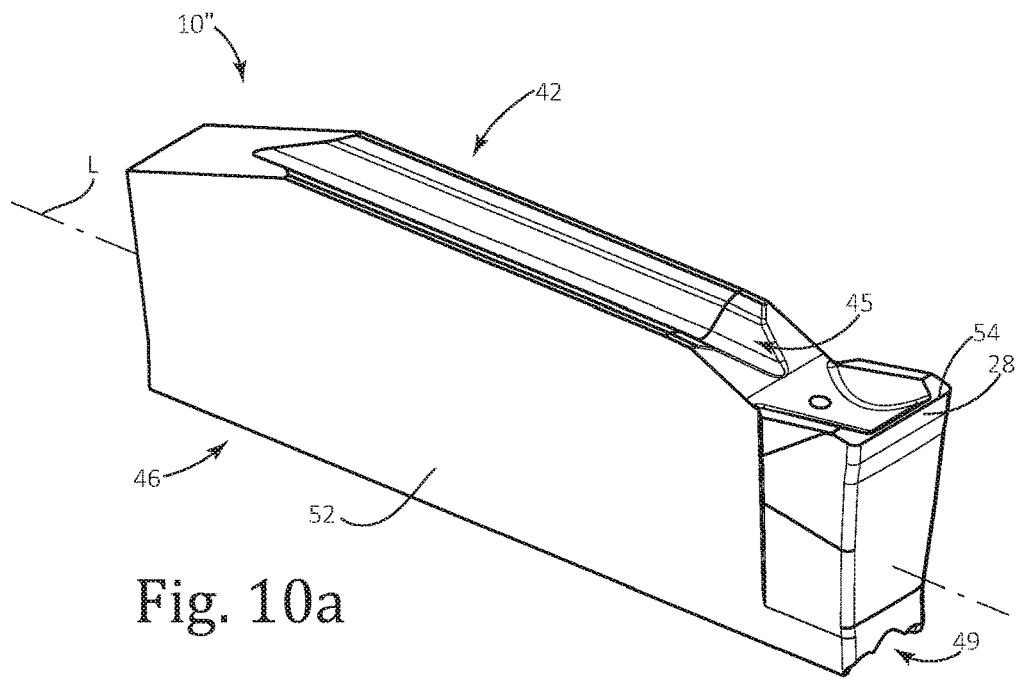
FIG. 10a is a perspective view of another cutting insert in accordance with some embodiments of the present invention.
Figure 10B:
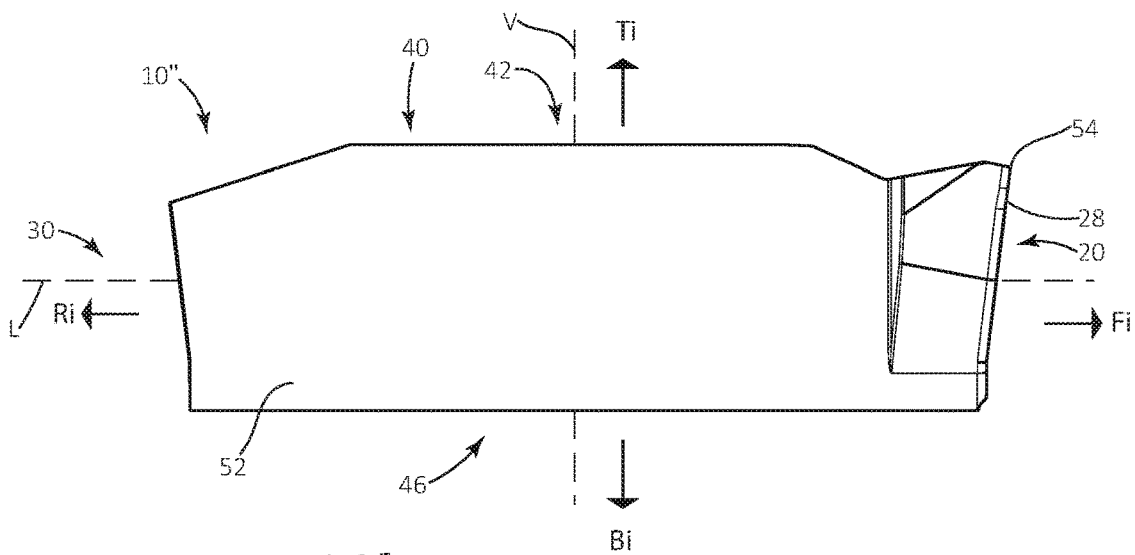
Figure 10C:
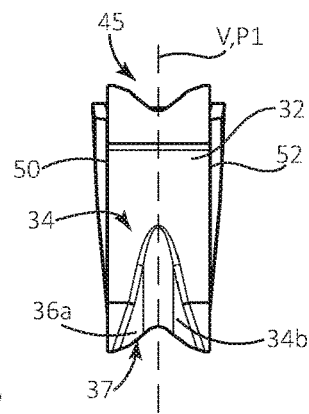

In some embodiments, as seen in FIGS. 10a to 10c, the cutting insert 10" has only one cutting edge (the first cutting edge 54). In these embodiments, the insert forward surface 20 may include an insert forward relief surface 28, and the insert rearward surface 30 may include an insert rear abutment surface 32 and an insert rear wedge surface 34.

In some embodiments, a second cutting edge 56 may be formed at an intersection of the insert rearward surface 30 and the insert peripheral surface 40 of the cutting insert 10, 10'. That is to say, the cutting insert 10, 10' is double-ended. As seen in FIGS. 3a to 3f, and FIGS. 9a to 9d, the second cutting edge 56 can be formed at an intersection of the insert rearward surface 30 and one of the insert top and insert bottom surfaces 42, 46.

When the second cutting edge 56 is formed at the intersection of the insert rearward surface and the insert top surface 42, the cutting insert 10, 10' may exhibit 180° rotational symmetry about the insert vertical axis V. On the other hand, when the second cutting edge 56 is formed at the intersection of the insert rearward surface 30 and the insert bottom surface 46, the cutting insert 10, 10' may exhibit 180° rotational symmetry about the insert lateral axis C.

To facilitate cutting with the second cutting edge 56, the insert rearward surface 30 further includes an insert rear relief surface 38 extending from the second cutting edge 56. The insert rear relief surface 38 may be parallel to the insert rear abutment surface 32. In some embodiments, the insert rear relief surface 38 may be coplanar with the insert rear abutment surface 32. Alternatively, the insert rear relief surface 38 may extend at an angle to the insert rear abutment surface 32.

In accordance with some embodiments, the insert rear relief surface 38 can be differently shaped, relative to the insert rear abutment surface 32. For example, one of the insert rear abutment surfaces 32 and the insert rear relief surface 38 may be planar, with the other being curved.

The transition between the insert rear relief surface 38 and the insert rear abutment surface 32 may be continuous or stepped. To clarify, the insert rear relief surface 38 extends from the second cutting edge 56, meaning it follows the contour of the second cutting edge 56 and extends therefrom. The insert rear abutment surface 32 is not limited to extending according to either the shape of the cutting edge or the shape of the insert rear relief surface 38. This allows more freedom in the position and surface shape of the insert rear abutment surface 32.

In accordance with some embodiments, the insert rear abutment surface 32 can be located between the insert rear relief surface 38 and the insert rear wedge surface 34, and the insert rear wedge surface 34 can extend to the insert peripheral surface 40. More specifically, the insert rear wedge surface 34 can extend to one of the insert top and insert bottom surfaces 42, 46.

In the case where the cutting insert 10, 10' includes two cutting edges (the first and second cutting edges 54, 56), the insert forward surface 20 must be formed so as to be retained inside the tool holder 100, allowing the second cutting edge 56 to work during machining operations. Thus, in such embodiments, the insert forward surface 20 further includes an insert forward abutment surface 22 and an insert forward wedge surface 24 extending from the insert forward abutment surface 22. The insert forward wedge surface 24 may extend to the insert peripheral surface 40. In accordance with some embodiments, the insert forward wedge surface 24 can extend to one of the insert top and insert bottom surfaces 42, 46.

In accordance with some embodiments, the insert forward wedge surface 24 may include at least a pair of insert forward stopper surfaces 26a, 26b. In accordance with some embodiments, the pair of insert forward stopper surfaces 26a, 26b can converge concavely from the first and second insert side surfaces 50, 52, toward the longitudinal insert plane P1, in the direction of the insert rearward surface 30 (i.e., in the insert rearward direction Ri).

In such case, the pair of insert forward stopper surfaces 26a, 26b straddle the longitudinal insert plane P1 and define a forward groove 27 on the insert forward surface 20. In some embodiments, the forward groove 27 may be recessed into the insert forward surface 20, relative to at least a portion of the insert forward abutment surface 22.

In accordance with some embodiments, the insert forward abutment surface 22 can be located between the insert forward relief surface 28 and the insert forward wedge surface 24. In such case, the insert forward wedge surface 24 can extend to the insert bottom surface 46.

In some embodiments, there is no overlap between the insert forward abutment surface 22 and the insert forward wedge surface 24 in the vertical direction (i.e. in the direction of the insert vertical axis V). In some embodiments, no portion of the insert forward abutment surface 22 is coplanar with any portion of the insert forward wedge surface 24.

Reference is now made to FIGS. 1, 2, 4, and 7 to 8d, showing the tool holder 100, 100', representing a second aspect of the invention. The tool holder 100, 100' extends along a holder longitudinal axis O, defining a holder forward direction Fh and a holder rearward direction Rh. The tool holder 100, 100' includes a holder front surface 120 extending between a first holder side surface 150 and an opposing second holder side surface 152.

An insert pocket 110 opens out to the holder front surface 120, the first holder side surface 150 and the second holder side surface 152. The insert pocket 110 is located at a forward end of the tool holder 100, 100'. The insert pocket 110 includes a rear pocket surface 130 located between a top pocket surface 142 and an opposing bottom pocket surface 146. The rear pocket surface 130 includes a pocket abutment surface 132 and a V-shaped pocket wedge surface 134.

In some embodiments, as illustrated by the tool holder 100 seen in FIGS. 1, 2, 4 and 7, the pocket abutment surface 132 can be closer to the bottom pocket surface 146 than the pocket wedge surface 134. In other embodiments, as illustrated by the tool holder 100' seen in FIGS. 8a to 8d, the pocket abutment surface 132 may be closer to the top pocket surface 142 than the pocket wedge surface 134.

In accordance with some embodiments, the pocket abutment surface 132 may be planar. Also, in some embodiments, there is no overlap between the pocket wedge surface 134 and the pocket abutment surface 132 in the vertical direction (i.e., the direction between the top pocket surface 142 and the opposing bottom pocket surface 146).

The pocket wedge surface 134 may include a pair of rear pocket stopper surfaces 136a, 136b. The pair of rear pocket stopper surfaces 136a, 136b may be configured for engagement with the pair of insert rear stopper surfaces 36a, 36b. In accordance with some embodiments, the pair of rear pocket stopper surfaces 136a, 136b can converge convexly towards the holder front surface 120 (i.e., in the holder forward direction Fh) from the first and second holder side surfaces 150, 152.

The pocket abutment surface 132, together with the pocket wedge surface 134 and its pair of rear pocket stopper surfaces 136a, 136b, constitute a forwardly protruding rear pocket rib 138. However, separate portions of the rear pocket rib 138 form the pocket abutment surface 132 and the pocket wedge surface 134, which are distinct from each other.

In some embodiments of the rear pocket rib 138, the vertical extent (i.e., the "height" extent in a direction between the top pocket surface 142 and the opposing bottom pocket surface 146) of the pocket wedge surface 134 differs from the vertical extent of the pocket abutment surface 132.

In some embodiments of the rear pocket rib 138, no portion of the pocket wedge surface 134 is coplanar with any portion of the pocket abutment surface 132. In some embodiments of the rear pocket rib 138, the lateral extent (i.e., the extent in the direction between the first and second holder side surfaces 150, 152) of the pocket wedge surface 134 differs from the lateral extent of the pocket abutment surface 132. Such differences in the surface geometries of the pocket wedge surface 134 and the pocket abutment surface 132 can help each from interfering with the function of the other.

A pocket wedge angle B, seen in FIG. 5a, is defined between the pair of rear pocket stopper surfaces 136a, 136b. The pocket wedge angle B may fulfil the condition: $90° \leq B \leq 150°$. More specifically, the pocket wedge angle B may fulfil the condition: $110° \leq B \leq 130°$.

In accordance with some embodiments, the insert rear wedge angle A and the pocket wedge angle B can fulfil the condition: $90° \leq A \leq B \leq 150°$. More specifically, due to the pair of rear pocket stopper surfaces 136a, 136b being configured for engagement with the pair of insert rear stopper surfaces

36a, 36b, the insert rear wedge angle A should be similar to the pocket wedge angle B. In accordance with some embodiments, the insert rear wedge angle A and the pocket wedge angle B can fulfil the condition: A=B.

The insert pocket 110 may further a pocket relief gap 156 located between the rear pocket surface 130 and at least one of the top and bottom pocket surfaces 142, 146. When a double-edged cutting insert 10, 10' is seated in the insert pocket 110 of the tool holder 100, 100', one of the first and second cutting edges 54, 56 are located in the pocket relief gap 156.

Figure 8A:
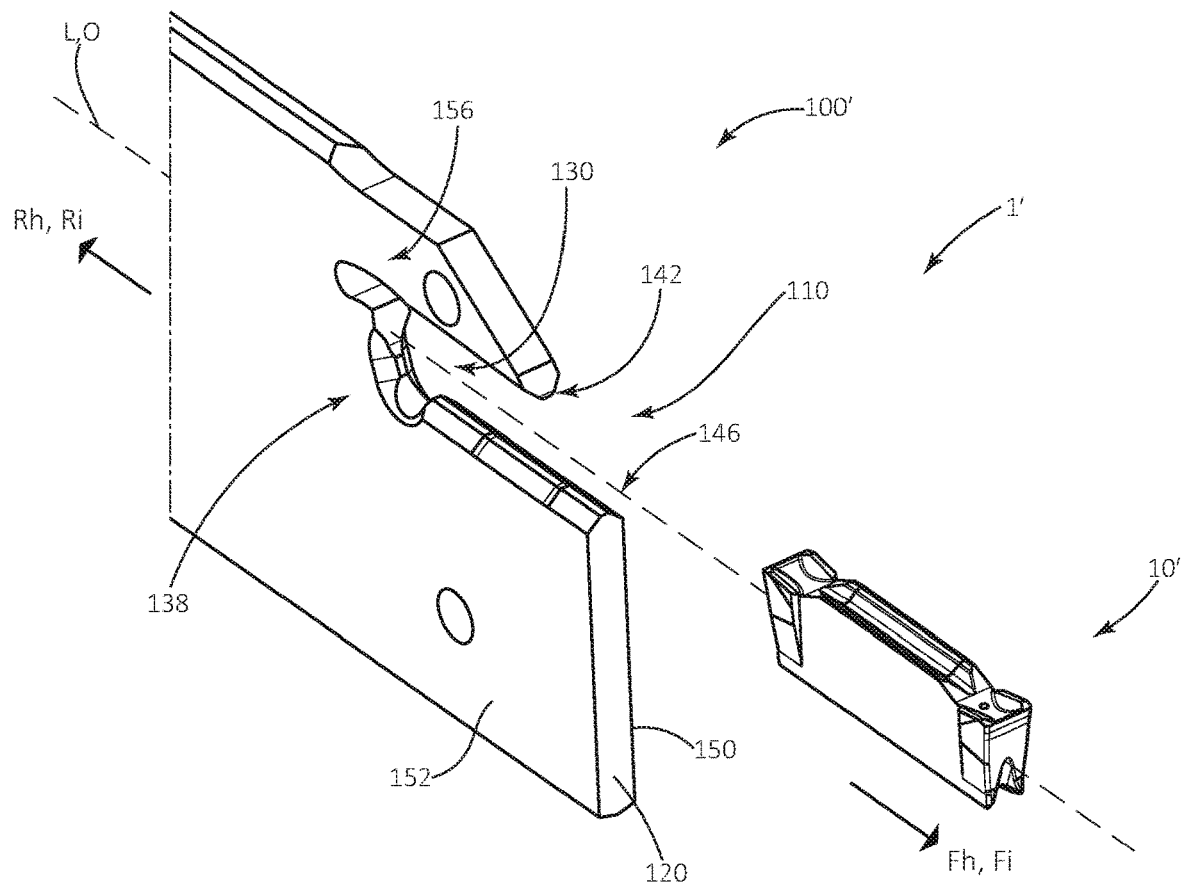
FIG. 8a is an exploded perspective view of a cutting tool in accordance with some embodiments of the present invention.
Figures 8B, 8C:
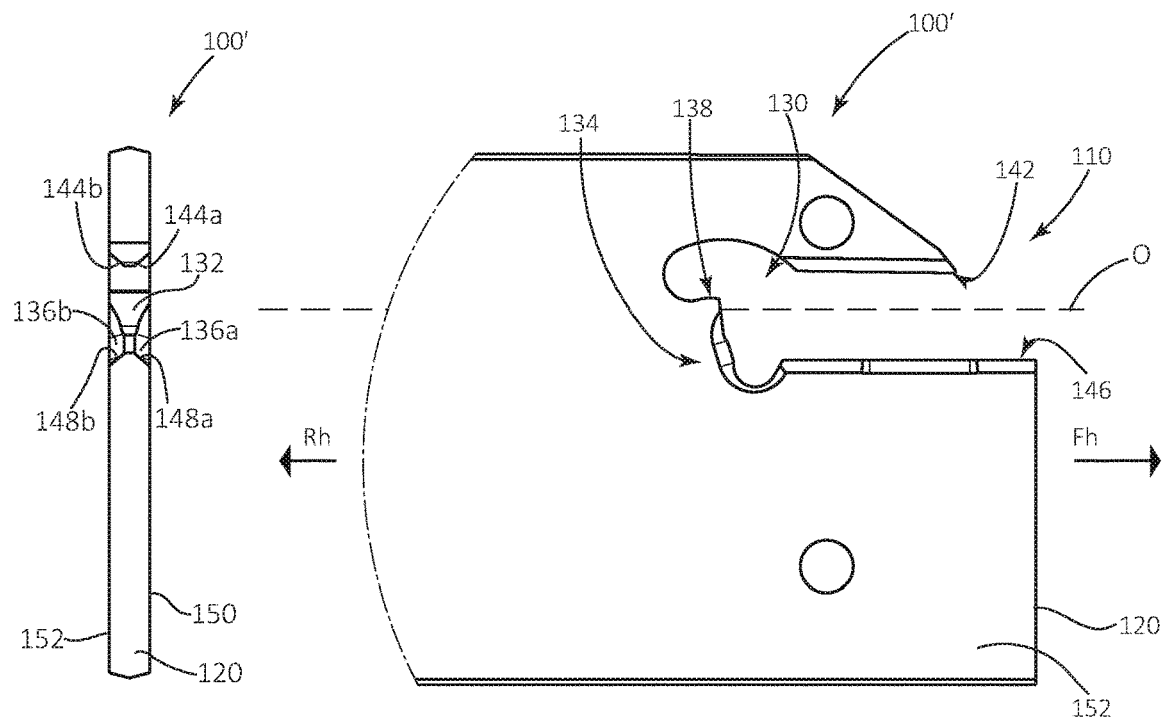
Figure 8D:
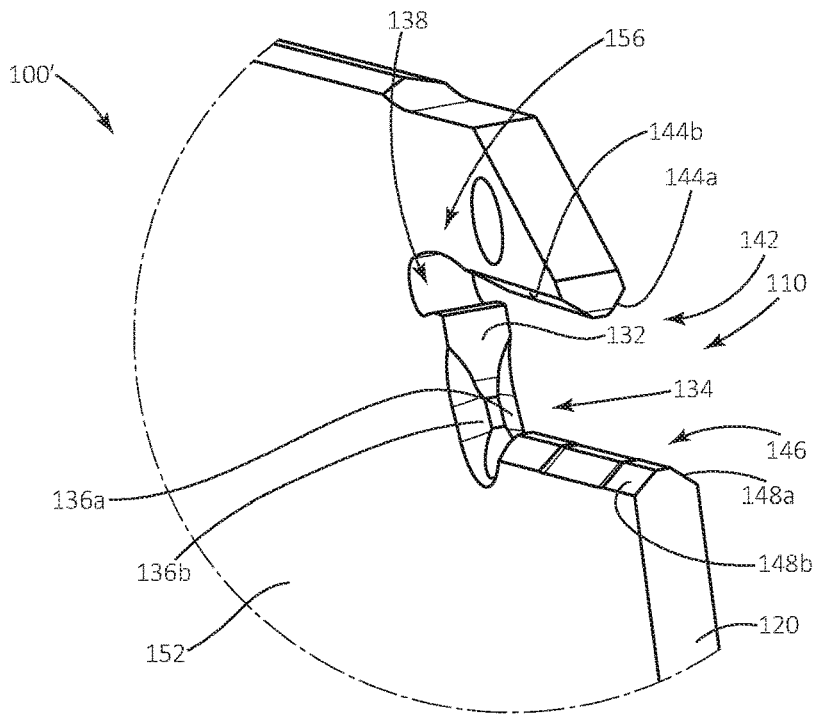
FIG. 8d is a perspective view of the tool holder shown in FIG. 8b.
Figure 9A:
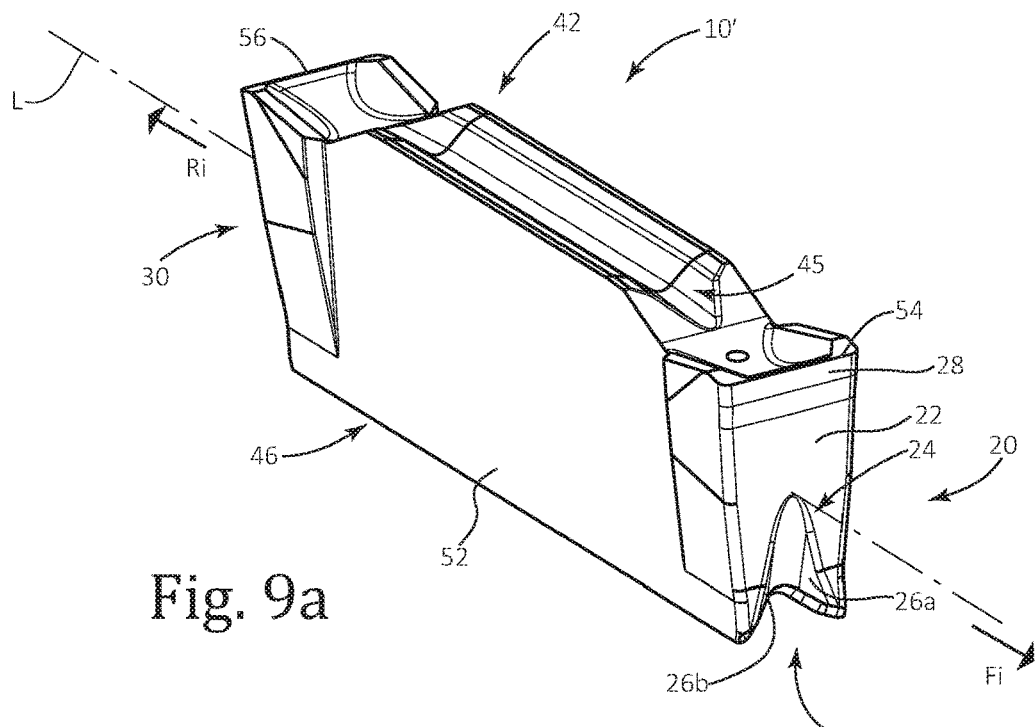
Figure 9B:
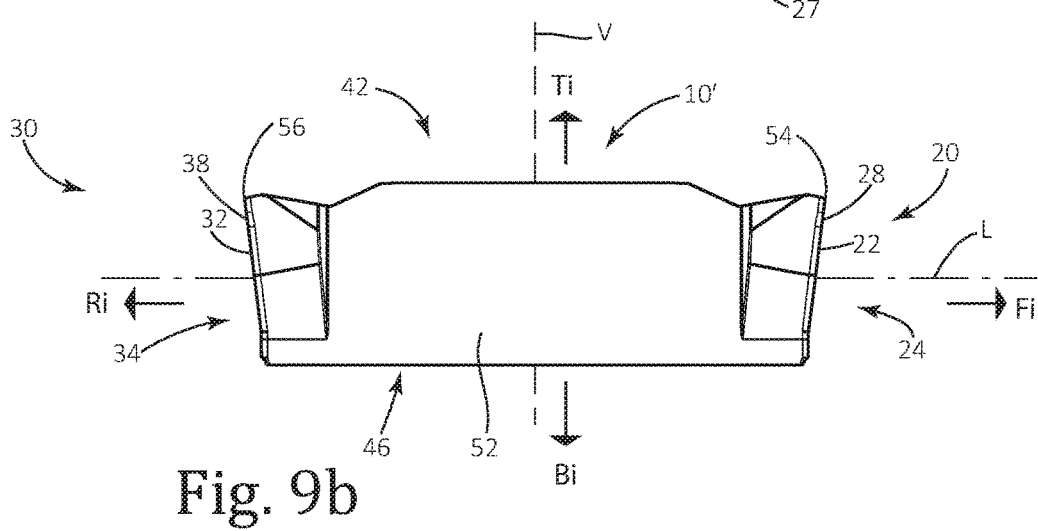
Figure 9D:
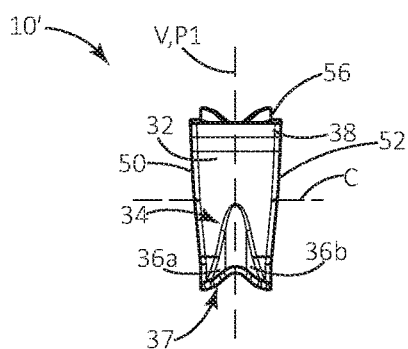
Figure 9C:
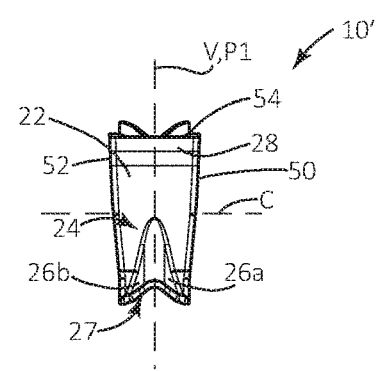

In accordance with some embodiments, exemplified by the tool holder 100' shown in FIG. 8a, when the pocket abutment surface 132 is closer to the top pocket surface 142 than the pocket wedge surface 134, the pocket relief gap 156 may be located between the top pocket surface 142 and the rear pocket surface 130.

Likewise, in some embodiments, exemplified by the tool holder 100 shown in FIG. 2, when the pocket abutment surface 132 is closer to the bottom pocket surface 146 than the pocket wedge surface 134, the pocket relief gap 156 may be located between the bottom pocket surface 146 and the rear pocket surface 130.

For example, when the cutting tool 1, 1' is assembled with the insert forward direction Fi of the double sided cutting insert 10, 10' facing away from the rear pocket surface 130 of the tool holder 100, 100', the second cutting edge 56 is located in the pocket relief gap 156. In such a case the insert rear relief surface 38 extending from the second cutting edge 56 may be located in the pocket relief gap 156, however it does not abut against the rear pocket surface 130 of the insert pocket 110.

The embodiments of the double-ended insert 10, 10' described in the present application may be inserted into the insert pocket 110 with either end of the insert 10, 10'. In the present application the insert forward direction Fi of the cutting insert 10, 10' and the first cutting edge 54 refer to the portion of the insert 10, 10' facing the workpiece (not shown) and used to machine it during cutting operations.

Likewise, the insert rearward direction Ri of the cutting insert 10, 10' and the second cutting edge 56 refer to the portion of the insert 10, 10' facing toward the tool holder 100, 100'.

When using the second cutting edge 56 during cutting operations, the insert 10, 10' is flipped according to its orientation, and the insert forward direction Fi becomes the insert rearward direction Ri while the insert rearward direction Ri becomes the insert forward direction Fi. For example, cutting insert 10 would be rotated 180° about the insert lateral axis C, while the cutting insert 10' would be rotated 180° about the insert vertical axis V.

In accordance with some embodiments, the top pocket surface 142 may include a pair of top pocket wedge surfaces 144a, 144b which converge from the first and second holder side surfaces 150, 152. The pair of top pocket wedge surfaces 144a, 144b are configured for engagement with the pair of top insert wedge surfaces 44a, 44b.

In some embodiments, the pair of top pocket wedge surfaces 144a, 144b can extend and converge convexly (i.e., from the first and second holder side surfaces 150, 152 toward the bottom pocket surface 146). Each surface of the pair of top pocket wedge surfaces 144a, 144b may be planar or curved.

The bottom pocket surface 146 may include a pair of bottom pocket wedge surfaces 148a, 148b which converge from the first and second holder side surfaces 150, 152. The pair of bottom pocket wedge surfaces 148a, 148b are configured for engagement with the pair of bottom insert wedge surfaces 48a, 48b.

In some embodiments, the pair of bottom pocket wedge surfaces 148a, 148b can extend and converge convexly (i.e., from the first and second holder side surfaces 150, 152 toward the top pocket surface 142). Each surface of the pair of bottom pocket wedge surfaces 148a, 148b may be planar or curved.

As specified above, when the cutting tool 1, 1' is in the assembled state, the cutting insert 10, 10', 10" is releasably clamped in the insert pocket 110. More specifically, as illustrated in FIGS. 1 and 2, the insert top surface 42 abuts the top pocket surface 142 and the insert bottom surface 46 abuts the bottom pocket surface 146.

As seen in FIGS. 5a to 6, the insert rear abutment surface 32 abuts against the pocket abutment surface 132 and the insert rear wedge surface 34 faces the pocket wedge surface 134 and is spaced apart therefrom. The distance between the insert rear wedge surface 34 and the pocket wedge surface 134 is not necessarily constant. In the present application, minimal margin d is defined as the minimal distance between the insert rear wedge surface 34 and the pocket wedge surface 134. The minimal margin d is one of the main factors deciding under what conditions the insert rear wedge surface 34 and the pocket wedge surface 134 abut one another. A too large minimal margin d means the insert rear wedge surface 34 and the pocket wedge surface 134 will not abut. A too small minimal margin d may put stringent requirements on the manufacture of the cutting tool 1, 1'.

The insert rear wedge surface 34 faces the pocket wedge surface 134 and is spaced apart therefrom by the minimal margin d. In accordance with some embodiments, the minimal margin d may fulfil the condition: $0.01 \text{ mm} \leq d \leq 0.1 \text{ mm}$. Specifically, minimal margin d may fulfil the condition: $0.02 \text{ mm} \leq d \leq 0.07 \text{ mm}$.

To clarify, the insert rear abutment surface 32 acts as a rear stopper for the insert 10, 10', 10", abutting against the pocket abutment surface 132 in a precise and repeatable manner. The insert rear wedge surface 34 does not abut the pocket wedge surface 134 when the cutting tool 1, 1' is assembled.

However, during cutting operations the insert 10, 10', 10" may be displaced sideways due to lateral forces (i.e., forces directed in a direction of the insert lateral axis C) arising from the cutting operation. In such cases, the insert rear wedge surface 34 may abut the pocket wedge surface 134 and provide resistance against the lateral forces.

The insert 10, 10', 10" is releasably clamped in the insert pocket 110 due to the top and bottom pocket surfaces 142, 146 bearing against the insert top and insert bottom surfaces 42, 46. Having said surfaces abut against one another using a V-shaped wedged interface strengthens the resilience of the cutting tool 1, 1' against lateral forces.

When the insert 10, 10', 10" is laterally displaced (i.e., displaced in a direction of the insert lateral axis C) by lateral forces during cutting operations, the insert rear wedge surface 34 abuts the pocket wedge surface 134, increasing the stability of the cutting tool 1, 1'. In particular, one of the pair of insert rear stopper surfaces 36a, 36b then abuts a corresponding one of the pair of rear pocket stopper surfaces 136a, 136b due to said lateral displacement.

The greater the distance between the insert rear wedge surface 34 and the pocket wedge surface 134, the easier the production of the parts of the cutting tool 1, 1'. At the same time, having a smaller distance between the insert rear wedge surface 34 and the pocket wedge surface 134 is advantageous, in that at least one surface of the pair of insert rear stopper surfaces 36a, 36b comes into abutment with the pair of rear pocket stopper surfaces 136a, 136b under lower lateral forces.

The cutting tool 1, 1', as well as the cutting insert 10, 10', 10" and the tool holder 100, 100' are preferably used in turning, grooving, parting off and groove-turning metal cutting operations.

During turning and groove-turning metal cutting operations, where lateral movement between the cutting tool 1, 1' and the workpiece may be introduced, lateral forces constantly displace the cutting insert 10, 10', 10", and thus change the positioning of the first cutting edge 54. Such displacement may then be mitigated by the introduction of the insert rear wedge surface 34 and the pocket wedge surface 134, allowing for a more resilient cutting tool and better quality of the finished workpiece.

In some embodiments, depending on the values of the minimal margin d between the insert rear wedge surface 34 and the pocket wedge surface 134, the insert rear wedge surface 34 and the pocket wedge surface 134 may abut only during extreme cutting conditions, acting as a fail-safe mechanism. With smaller values of the minimal margin d, the insert rear wedge surface 34 and the pocket wedge surface 134 may abut during normal machining conditions as well.

In grooving cutting operations, typically the lateral forces the cutting insert 10, 10', 10" experiences are limited, due to the forces bearing on the cutting tool 1, 1' being directed mostly perpendicular to the first cutting edge 54 (i.e. in a direction of the insert vertical axis V). In such cases the insert rear wedge surface 34 and the pocket wedge surface 134 may not abut one another during normal cutting operations. Instead, the insert rear wedge surface 34 and the pocket wedge surface 134 act as a fail-safe mechanism, in that when cutting conditions are extreme, or when a malfunction occurs, the insert rear wedge surface 34 and the pocket wedge surface 134 abut one another, supplementing the resilience of the cutting insert 10, 10', 10" against lateral forces.

Although the subject matter of the present application has been described to a certain degree of particularity, it should be understood that various alterations and modifications could be made without departing from the spirit or scope of the invention as hereinafter claimed.

What is claimed is:

1. A cutting tool (1, 1'), comprising:
a cutting insert (10, 10', 10") extending along an insert longitudinal axis (L) defining an insert forward direction (Fi) and an insert rearward direction (Ri), the insert (10, 10', 10") comprising:
an insert forward surface (20) and an opposing insert rearward surface (30), with an insert peripheral surface (40) extending therebetween;
the insert rearward surface (30) comprising an insert rear abutment surface (32) and a V-shaped insert rear wedge surface (34);
the insert peripheral surface (40) comprising an insert top surface (42), an opposing insert bottom surface (46), a first insert side surface (50) and an opposing second insert side surface (52); and
a first cutting edge (54) formed at an intersection of the insert top surface (42) and the insert forward surface (20); and
a tool holder (100, 100') extending along a holder longitudinal axis (O) defining a holder forward direction (Fh) and a holder rearward direction (Rh), comprising:

a first holder side surface (150) and an opposing second holder side surface (152), with a holder front surface (120) extending therebetween; and
an insert pocket (110) opening out to the holder front surface (120), the first holder side surface (150) and the second holder side surface (152), the insert pocket (110) comprising:
a top pocket surface (142) and an opposing bottom pocket surface (146), with a rear pocket surface (130) located therebetween, the rear pocket surface (130) comprising:
a pocket abutment surface (132); and
a V-shaped pocket wedge surface (134) distinct from the pocket abutment surface (132);
wherein:
the cutting tool (1, 1') is adjustable between a disassembled state and an assembled state; and
when the cutting tool (1, 1') is in the assembled state:
the cutting insert (10, 10', 10") is releasably clamped in the insert pocket (110);
the insert top surface (42) abuts the top pocket surface (142);
the insert bottom surface (46) abuts the bottom pocket surface (146);
the insert rear abutment surface (32) abuts against the pocket abutment surface (132); and
the insert rear wedge surface (34) faces the pocket wedge surface (134) and is spaced apart therefrom by a minimal margin d.

2. The cutting tool (1, 1'), according to claim 1, wherein:
the insert top surface (42) comprises a pair of top insert wedge surfaces (44a, 44b) which converge from the first and second insert side surfaces (50, 52);
the insert bottom surface (46) comprises a pair of bottom insert wedge surfaces (48a, 48b) which converge from the first and second insert side surfaces (50, 52);
the top pocket surface (142) comprises a pair of top pocket wedge surfaces (144a, 144b) which converge from the first and second holder side surfaces (150, 152), and are configured for engagement with the pair of top insert wedge surfaces (44a, 44b); and
the bottom pocket surface (146) comprises a pair of bottom pocket wedge surfaces (148a, 148b) which converge from the first and second holder side surfaces (150, 152) and are configured for engagement with the pair of bottom insert wedge surfaces (48a, 48b).

3. The cutting tool (1, 1'), according to claim 2, wherein:
The pairs of top and bottom insert wedge surfaces (44a, 44b, 48a, 48b) extend and converge concavely; and
the pairs of top and bottom pocket wedge surfaces (144a, 144b, 148a, 148b) extend and converge convexly.

4. The cutting tool (1, 1'), according to claim 1, wherein:
the insert rear wedge surface (34) comprises a pair of insert rear stopper surfaces (36a, 36b) which converge concavely from the first and second insert side surfaces (50, 52); and
the pocket wedge surface (134) comprises a pair of rear pocket stopper surfaces (136a, 136b) which converge convexly from the first and second holder side surfaces (150, 152) and are configured for engagement with the pair of insert rear stopper surfaces (36a, 36b).

5. The cutting tool (1, 1'), according to claim 4, wherein:
an insert rear wedge angle A is defined between the pair of insert rear stopper surfaces (36a, 36b);
a pocket wedge angle B is defined between the pair of rear pocket stopper surfaces (136a, 136b); and the insert rear wedge angle A and the pocket wedge angle B fulfil the condition: 90°≤A≤B≤150°.

6. The cutting tool (1, 1'), according to claim 1, wherein the minimal margin d fulfills the condition: 0.01 mm≤d≤0.1 mm.

7. The cutting tool (1, 1'), according to claim 1, wherein:
the cutting insert (10, 10') further comprises a second cutting edge (56) formed at an intersection of the insert rearward surface (30) and the insert peripheral surface (40);
the insert pocket (110) further comprises a pocket relief gap (156) located between one of the top and bottom pocket surfaces (142, 146) and the rear pocket surface (130); and
when the cutting tool (1, 1') is assembled, the second cutting edge (56) is located in the pocket relief gap (156).

8. The cutting tool (1, 1'), according to claim 7, wherein:
the insert rearward surface (30) further comprises an insert rear relief surface (38) extending from the second cutting edge (56); and
when the cutting tool (1, 1') is assembled, the insert rear relief surface (38) is located in the pocket relief gap (156).

9. The cutting tool (1, 1'), according to claim 8, wherein:
the insert rear abutment surface (32) is located between the insert rear relief surface (38) and the insert rear wedge surface (34);
the insert forward surface (20) comprises:
an insert forward relief surface (28) extending from the first cutting edge (54);
an insert forward abutment surface (22); and
an insert forward wedge surface (24) extending from the insert forward abutment surface (22); and
the insert forward abutment surface (22) is located between the insert forward relief surface (28) and the insert forward wedge surface (24).

10. The cutting tool (1, 1'), according to claim 9, wherein:
the insert rear wedge surface (34) extends to the insert peripheral surface (40); and
the insert forward wedge surface (24) extends to the insert bottom surface (46).

11. The cutting tool (1'), according to claim 1, wherein the cutting insert (10', 10'') is resiliently clamped in the tool holder (100).

12. The cutting tool (1, 1') according to claim 1, wherein:
the insert rear wedge surface (34) comprises a pair of converging insert rear stopper surfaces (36a, 36b) which define a rear groove (37) on the insert rearward surface (30), the rear groove (37) being recessed into the insert rearward surface (30) relative to at least a portion of the insert rear abutment surface (32);
there is no overlap between the insert rear abutment surface (32) and the insert rear wedge surface (34) in a vertical direction extending between the insert top surface (42) and the insert bottom surface (46);
no portion of the insert rear abutment surface (32) is coplanar with any portion of the insert rear wedge surface (34); and
the pocket abutment surface (132), together with the V-shaped pocket wedge surface (134), constitute a forwardly protruding rear pocket rib (138), and wherein on the rear pocket rib (138):
a vertical extent of the V-shaped pocket wedge surface (134) differs from a vertical extent of the pocket abutment surface (132);
a lateral extent of the V-shaped pocket wedge surface (134) differs from a lateral extent of the pocket abutment surface (132); and
no portion of the V-shaped pocket wedge surface (134) is coplanar with the pocket abutment surface (132).

13. A double-ended cutting insert (10, 10') having an insert longitudinal axis (L) defining an insert forward direction (Fi) and an insert rearward direction (Ri), an insert vertical axis (V) defining an insert top direction (Ti) and an insert bottom direction (Bi), the insert vertical axis (V) intersecting the insert longitudinal axis (L), with a longitudinal insert plane (P1) defined as containing the insert vertical axis (V) and the insert longitudinal axis (L), the cutting insert (10, 10') comprising:
an insert forward surface (20) and an opposing insert rearward surface (30), with an insert peripheral surface (40) extending therebetween;
an insert top surface (42) and an opposing insert bottom surface (46), each extending along the insert peripheral surface (40);
a first cutting edge (54) formed at an intersection of the insert top surface (42) and the insert forward surface (20); and
a second cutting edge (56) formed at an intersection of the insert peripheral surface (40) and the insert rearward surface (30);
wherein:
the insert rearward surface (30) comprises:
an insert rear relief surface (38) extending from the second cutting edge (56);
an insert rear abutment surface (32);
an insert rear wedge surface (34);
the insert forward surface (20) comprises:
an insert forward relief surface (28) extending from the first cutting edge (54);
an insert forward abutment surface (22); and
an insert forward wedge surface (24).

14. The cutting insert (10, 10'), according to claim 13, wherein:
the insert rear wedge surface (34) comprises a pair of insert rear stopper surfaces (36a, 36b);
an insert rear wedge angle (A) is defined between the pair of insert rear stopper surfaces (36a, 36b); and
the insert rear wedge angle (A) fulfils the condition: 90°≤A≤150°.

15. The cutting insert (10, 10') according to claim 13, wherein:
the insert rear wedge surface (34) comprises a pair of converging insert rear stopper surfaces (36a, 36b) which define a rear groove (37) on the insert rearward surface (30), the rear groove (37) being recessed into the insert rearward surface (30) relative to at least a portion of the insert rear abutment surface (32);
there is no overlap between the insert rear abutment surface (32) and the insert rear wedge surface (34) along the insert vertical axis (V); and
no portion of the insert rear abutment surface (32) is coplanar with any portion of the insert rear wedge surface (34).

16. The cutting insert (10') according to claim 15, wherein:
the second cutting edge (56) is formed at an intersection of the insert top surface (42) and the insert rearward surface (30);
the insert rear abutment surface (32) is closer to the insert top surface (42) than the insert rear wedge surface (34); and the cutting insert (10′) has 180° rotational symmetry about the insert vertical axis (V).

17. The cutting insert (10) according to claim 15, wherein:
the second cutting edge (56) is formed at an intersection of the insert bottom surface (46) and the insert rearward surface (30);
the insert rear abutment surface (32) is closer to the insert bottom surface (46) than the insert rear wedge surface (34); and
the cutting insert (10) has 180° rotational symmetry about an insert lateral axis (C), which intersects, and is perpendicular to, both the insert longitudinal axis (L) and the insert vertical axis (V).

18. A tool holder (100, 100′) extending along a holder longitudinal axis (O) defining a holder forward direction (Fh) and a holder rearward direction (Rh), the tool holder (100) comprising:
a first holder side surface (150) and an opposing second holder side surface (152), with a holder front surface (120) extending therebetween; and
an insert pocket (110) opening out to the holder front surface (120), the first holder side surface (150) and the second holder side surface (152), the insert pocket (110) comprising:
a top pocket surface (142) and an opposing bottom pocket surface (146), with a rear pocket surface (130) located therebetween;
wherein:
the rear pocket surface (130) comprises:
a pocket abutment surface (132); and
a V-shaped pocket wedge surface (134) distinct from the pocket abutment surface (132).

19. The tool holder (100, 100′), according to claim 18, wherein the insert pocket (110) further comprises a pocket relief gap (156), located between the rear pocket surface (130) and at least one of the top and bottom pocket surfaces (142, 146).

20. The tool holder (100′), according to claim 19, wherein:
the pocket abutment surface (132) is closer to the top pocket surface (142) than the pocket wedge surface (134); and
the pocket relief gap (156) is located between the top pocket surface (142) and the rear pocket surface (130).

21. The tool holder (100), according to claim 19, wherein:
the pocket abutment surface (132) is closer to the bottom pocket surface (146) than the pocket wedge surface (134); and
the pocket relief gap (156) is located between the bottom pocket surface (146) and the rear pocket surface (130).

22. The tool holder (100) according to claim 19, wherein:
a pocket wedge angle (B) is defined between the pair of rear pocket stopper surfaces (136a, 136b); and
the pocket wedge angle (B) fulfils the condition: 90°≤B≤150°.

23. The tool holder (100) according to claim 19, wherein:
the pocket abutment surface (132), together with the V-shaped pocket wedge surface (134), constitute a forwardly protruding rear pocket rib (138), and wherein on the rear pocket rib (138):
a vertical extent of the V-shaped pocket wedge surface (134) differs from a vertical extent of the pocket abutment surface (132);
a lateral extent of the V-shaped pocket wedge surface (134) differs from a lateral extent of the pocket abutment surface (132); and
no portion of the V-shaped pocket wedge surface (134) is coplanar with the pocket abutment surface (132).

* * * * *